United States Patent [19]
Rosich et al.

[11] Patent Number: 5,765,193
[45] Date of Patent: Jun. 9, 1998

[54] SYSTEM FOR CONTROLLING A WRITE OPERATION INVOLVING DATA HELD IN A WRITE CACHE

[75] Inventors: Mitchell N. Rosich; Eric S. Noya, both of Groton; Jeffrey T. Wong, Framingham, all of Mass.

[73] Assignee: Digital Equipment Corporation, Maynard, Mass.

[21] Appl. No.: 680,583

[22] Filed: Jul. 9, 1996

Related U.S. Application Data

[63] Continuation of Ser. No. 86,454, Jul. 1, 1993, abandoned.
[51] Int. Cl.$^6$ .................................................. G06F 12/00
[52] U.S. Cl. .............................. 711/136; 711/160; 711/4
[58] Field of Search ............................. 395/460, 463, 395/487, 404, 438; 711/136, 160, 133, 159, 4, 111

[56] References Cited

U.S. PATENT DOCUMENTS

| | | | |
|---|---|---|---|
| 4,636,946 | 1/1987 | Hartung et al. | 711/136 |
| 5,420,983 | 5/1995 | Noya et al. | 395/850 |

*Primary Examiner*—Jack A. Lane
*Attorney, Agent, or Firm*—Diane C. Drozenski; Arthur W. Fisher

[57] ABSTRACT

A data storage system includes a multi-tasking processor which manages a write cache to identify adjacent blocks held in the write cache which are to be included in a next write operation, while at the same time handling data transfer requests from a system host. The processor monitors the write cache and when the cache has fewer than a predetermined number of storage locations free, initiates a block-merge task. The processor then determines which block in the write cache is least recently used and, based on virtual block numbers assigned to the data blocks, identifies the blocks in the write cache which are adjacent to the least recently used block and are within the same chunk as that block. The processor maintains a list of these adjacent blocks and the locations in which the blocks are held in the write cache. Thereafter, when the cache has fewer than a lower predetermined number of adjacent blocks free, the processor transfers block identifiers and the addresses of the blocks in the write cache to the data storage device, which allows the data storage device to retrieve the data blocks from the write cache in the order in which they are to be stored on the storage device.

17 Claims, 8 Drawing Sheets

ONCE THE DATA HAS BEEN —142
TRANSFERRED TO THE DISK
CONTROLLER RESET THE
APPROPRIATE SEMAFORE AND
OWNER FLAGS IN THE TAGS
OF THE DATA BLOCKS INVOLVED
IN THE WRITE OPERATION

UPDATE THE LOCATION -FREE LIST —— 144
TO INDICATE THAT THE CACHE
LOCATIONS WHICH HELD THE
DATA INVOLVED IN THE DISK
WRITE OPERATION ARE NOW FREE

SYSTEM FOR CONTROLLING A WRITE OPERATION INVOLVING DATA HELD IN A WRITE CACHE

This application is a continuation of application Ser. No. 08/086,454, filed Jul. 1, 1993 now abandoned.

FIELD OF THE INVENTION

This invention relates generally to disk drives, and in particular, to a technique for merging cached write requests.

BACKGROUND

Advantages in electronic circuit technology have greatly increased the speed at which central processing unit ("CPU") components of a computer system operate. CPU integrated circuits having cycle times in excess of 60 MHz are now widely available. System components such as random access memories ("RAMs") are typically constructed using the same technologies, and thus, their cycle times match the speeds of the central processing unit components.

The speed with which secondary storage devices, such as disk drives, operate is generally slower than that of the other components in the computer system. The time to complete a disk access is largely dominated by the time required for mechanical drive components to move a read/write head to the proper location relative to the disk and the time for the storage location to rotate under the head. Once the head is in position over the storage location, it performs the remainder of the read or write operation at speeds comparable to those of the components of the CPU.

The time required to position the read/write head over the storage location is commonly referred to as seek time. Fast disk drives have seek times generally in the range of 8–10 milliseconds and are thus several orders of magnitude longer than the time required for the head integrated circuit components to retrieve data from the disk or store data on the disk.

Data are recorded on the disks in concentric tracks, which are divided into sectors. Each sector holds a block of data. A block is the smallest quantity of data which can be written to a disk. A "chunk," which consists of a number of adjacent blocks, is typically the largest quantity of data written to a disk in a single write operation without performing a seek operation to re-position the read/write bead. Chunks vary in size from system to system, depending on the architecture of the system and the application s performed by the system.

A write operation that involves a single block of data is inefficient, since very little data is stored after a time-consuming seek operation. One way to increase the efficiency of the system is to retain the data blocks to be written to the disk in a buffer, accumulate a number of blocks and include them in a disk write operation. The accumulated blocks must be intended for contiguous storage locations on the disk to be included in the write operation, however. Such blocks are referred to as "adjacent blocks." Buffers for accumulating these data blocks are commonly referred to as write caches.

Write caches, which must be non-volatile memories to protect the data from loss or corruption before they are stored on the storage device, are expensive. Accordingly, many systems use relatively small write caches. Further, these caches must be carefully managed to prevent loss of data and also to ensure that the efficiencies and advantages of including the cache in the system are not lost. This is particularly true because the data blocks held in the cache are not ordinarily held in the order in which they are to be stored on the disk. As data blocks are included in various write operations, the cache storage locations in which they were retained are freed. When data blocks are later added to the write cache they are placed in the free locations, which may or may not be contiguous. Generally, the locations are not contiguous and the data blocks are thus "scattered" throughout the cache.

It has been known for some time that requests for data from a disk typically are directed to related data, such as data files. These data files are often written to the disk in a single write operation and are stored in a number of physically adjacent sectors, or disk storage locations. Accordingly, a principle of "locality of reference" has developed among computer programmers which states: when data stored or to be stored at one location are accessed, there is a high probability that data stored or to be stored at physically adjacent locations will be accessed soon thereafter.

To take advantage of this principle, data to be written to a disk are held for a time in the write cache, so that they can be accessed relatively quickly, that is, without performing a disk read operation to retrieve them from the disk. Since it is likely that these data will be accessed relatively soon after they are sent for storage, the use of the cache speeds up the overall operation of the system. The system must keep track of which data blocks are held in the write cache to direct read requests for these to the write cache instead of the disk.

Once the write cache is filled, the system performs one or more write operations to transfer data from the cache to the disk drive for storage therein. There are several techniques for managing the orderly transfer of data from the write cache to the drive. One known technique is to include in a disk write operation a search of the write cache for an adjacent data block. If an adjacent block is found, the system transfers both blocks to the disk as part of the disk write operation. This reduces the overall number of disk accesses, and thus, the overall number of the time-consuming seek operations.

Another technique for managing the write cache involves keeping a "least recently used" (LRU) queue. The LRU queue contains a list of blocks in their order of use. The LRU queue identifies blocks by their time of use and their "virtual block numbers," which are numbers associated with the intended storage locations of the blocks on the disk. Since it is likely that the system will access blocks which were more recently used before it again accesses the least recently used blocks, the system transfers these least recently used blocks to the disk while retaining the more recently used blocks in the cache for quick access by the CPU.

The techniques discussed above for managing the transfer of data from the write cache to the disk handle data in quantities of one or two blocks. They thus may not satisfactorily enhance the speed with which the system performs write operations. Accordingly, a technique which includes more data per write operation is needed. Further, what is needed is an efficient mechanism to accumulate these data in the order in which they are to be stored on the disk.

SUMMARY OF THE INVENTION

The inventive system includes a multi-tasking control processor which controls disk write operations and manages data in a write cache such that each disk write operation includes (a) a first task of determining if any or all of the data blocks included in the write operation are stored in contiguous write cache locations and retrieving the data blocks from the write cache and retaining them, in the order in which they are to be written to the disk, in consecutive locations of a buffer and (b) a second task of transferring the blocks from the buffer to the disk for storage in contiguous storage locations.

More specifically, when the write cache becomes nearly filled, the processor initiates a block-merge task. The processor selects a particular block in the write cache, for example, the oldest block, determines the associated chunk, or as applicable stripe, boundaries and searches the write cache for adjacent blocks within the boundaries. If the selected block and the adjacent blocks are all stored in the write cache in non-contiguous locations the processor includes in a write ring, for each of the blocks, a "block descriptor." The block descriptor contains the virtual block number of the associated block, the address of the write cache location in which the block is stored and a "link bit," which is set in all the descriptors except the one associated with the last block in the write operation. The reset link bit in the descriptor for the last block signifies that the processor can not guarantee that the block associated with the next descriptor on the ring will be written to a contiguous location on the disk.

If any of these adjacent blocks are stored in contiguous locations, the processor includes in the write ring for these blocks a single descriptor containing the lowest virtual block number of the adjacent blocks, a block count equal to the number of adjacent blocks and with a set or reset link bit as appropriate. For each block write operation involving a single data block, the processor includes in the write ring a single block descriptor containing the virtual block number of the block, a block count of one and a reset link bit.

The processor continues selecting blocks, searching for adjacent blocks and adding descriptors to the write ring, as appropriate. When a transfer of data blocks to the disk is to be performed, the processor sends the descriptors to the disk controller. The controller examines the descriptor for the next write operation, and if it has the link bit set, the disk controller retrieves the associated data block from the write cache and retains the block in a buffer. The controller then retrieves from the write cache the data block associated with the next descriptor on the write ring, retains the data block in a consecutive location in the buffer and so forth, until the disk controller encounters a descriptor with a reset link bit. The controller then retrieves the data block associated with this descriptor from the write cache, places the data block in a consecutive location in the buffer and begins a data transfer operation to transfer the data from the buffer to the disk. This transfer is performed relatively quickly, since the data blocks are arranged in order in the buffer.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENTS

Figure 1:
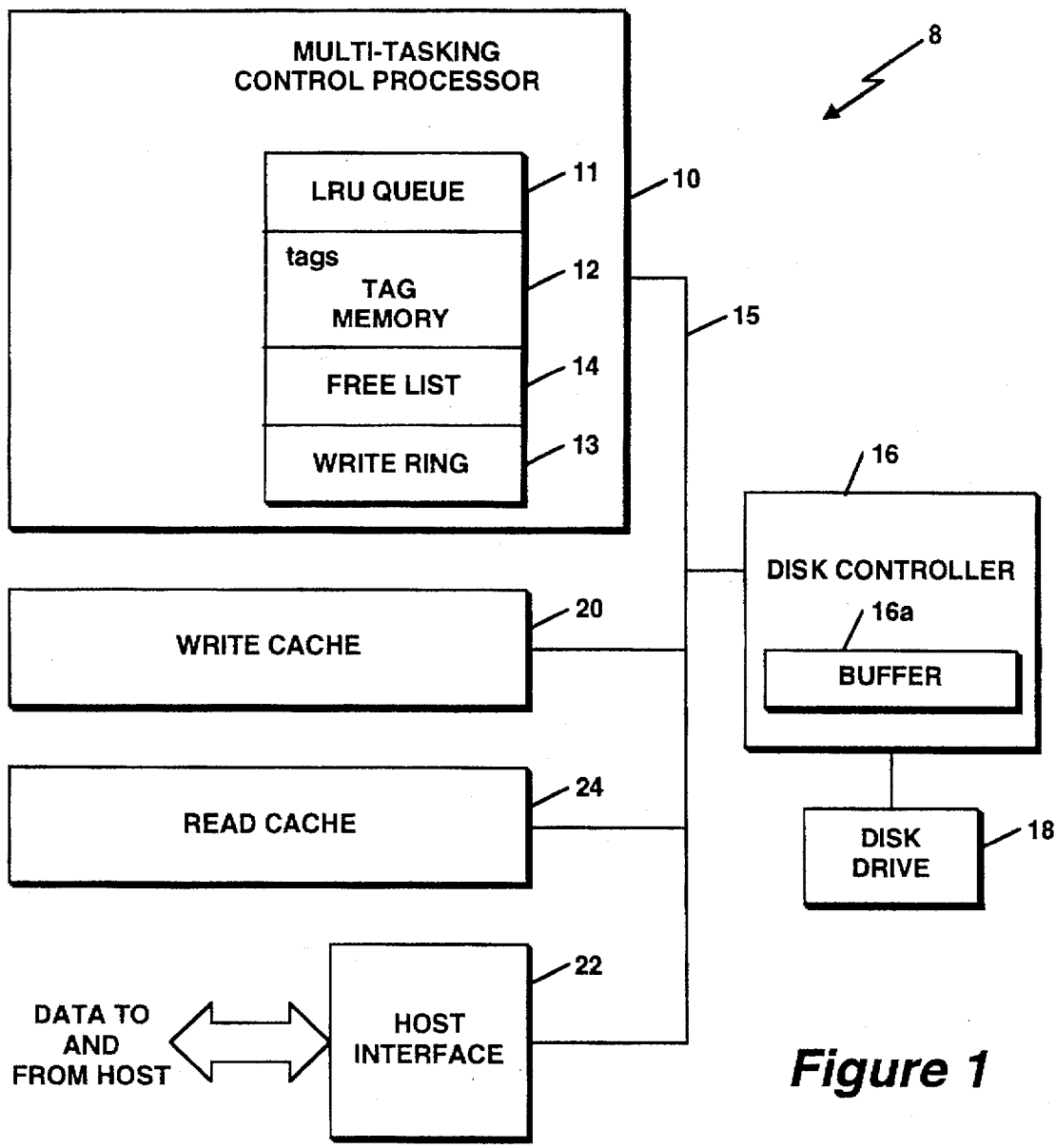
FIG. 1 is a block diagram of a data storage system constructed in accordance with the invention which includes a processor for controlling write operations.

FIG. 1 depicts a data storage system 8 which includes a multi-tasking control processor 10 for controlling read and write operations directed to a disk drive 18. The processor 10 sends control information over a bus 15 to direct data, respectively, to and from a disk controller 16, a write cache 20 and a host interface 22. The system may also include a read cache 24, which operates under the control of the processor 8. The processor controls the operations of the disk controller 16 when it is retrieving data from the write cache for a disk write operation, directing the controller to retain the data blocks in order in a buffer before accessing the disk. The disk controller 16 otherwise operates in a conventional manner to retrieve data from the disk drive 18 during a disk read operation and store data on the disk drive 18 during a disk write operation.

The processor 10 directs data to be stored on the disk first to a write cache 20 which, in a preferred embodiment, it manages through information stored in a least recently used (LRU) queue 11, a tag memory 12 and a write ring 13, as discussed in more detail below with reference to FIGS. 4A–4D. Essentially, the processor 10 manages the write cache to include in a write operation as many data blocks as can be written to physically adjacent locations on the disk. The processor 10 may use the chunk boundaries as indicators of the maximum number of blocks which can be included in a write operation. In systems with multiple disk drives operating in synchronism, the processor may instead use stripe boundaries.

Each time the host interface 22 directs data to the disk drive 18, the processor 10 redirects the data to the write cache 20. The processor finds a free storage location in the write cache 20 for each data block from the host interface by consulting a location-free list 14. It then sends the data blocks to these write cache locations and updates the list 14, to indicate that these locations are no longer free. It also updates the LRU queue 11, adding to it a block identifier and an associated time of use for each block. The block identifiers are the virtual block numbers assigned to the blocks, in a conventional manner, by the host interface 22.

The LRU queue orders entries by time of use. It is a linked list, with each entry including pointers to a previous and a next entry. The controller also assigns each of the blocks a tag 12a which, as discussed in more detail with reference to FIG. 2 below, includes the virtual block number and various read and write monitor flags. It stores the tags in the tag memory 12, preferably in locations corresponding to the cache locations in which the data blocks are held. If the tags are not stored in corresponding locations, the tags also include the addresses of the cache locations in which the corresponding data blocks are stored.

The control processor 10 monitors the location-free list 14 to determine when the number of free locations reaches a free-block-low threshold, which indicates that the write cache is becoming full, and then a cache-almost-full threshold, which indicates that blocks of data must be transferred from the write cache 20 to the disk drive 18. As discussed in more detail below with reference to FIGS. 4A–4D, the processor 10 uses the free-block-low threshold to determine when to begin a block-merge task to locate adjacent data blocks in the cache and the cache-almost-full threshold to determine when to begin a block-retire task to transfer these adjacent blocks to disk. The processor thus initiates the block-merge task while it is continuing to process write requests from the host interface. When the cache becomes almost full, the processor is ready to perform the next disk write operation and free the associated cache storage locations.

Referring still to FIG. 1, the controller 10 maintains a write ring 13, into which it enters block descriptors associated with the blocks to be included in the disk write operations. The descriptors, which are described in more detail with reference to FIG. 3 below, include a link bit which indicates whether data blocks stored in non-contiguous write cache locations are to be included in an associated write operation. The processor adds descriptors to the ring 13 during block-merge operations and removes descriptors from the ring during block-retire operations, as discussed in more detail below with reference to FIGS. 4 and 5 below.

Figure 2:
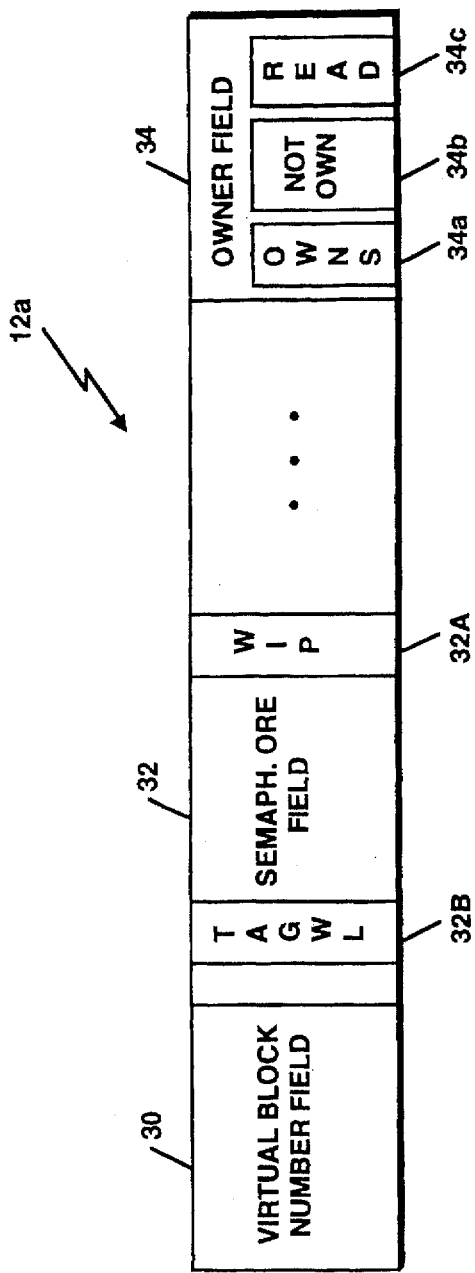
FIG. 2 depicts a write cache tag.

As depicted in FIG. 2, the tag 12a contains a number of fields which are used by the control processor 10 to manage the information in the write cache 20. The tag 12a includes a virtual block number field 30, which indicates the location on disk drive 18 to which the data block is directed, a semaphore field 32 which includes various read and write monitor flags to protect the tag and the corresponding data block from being overwritten at an inappropriate time, and an owner field 34 which indicates the "ownership status" of the associated location in the write cache 20. The semaphore field 32 includes a write-in-progress flag 32a and a tag write-lock flag 32b, which are used in a conventional manner to control access to the tag and the associated data block. The owner field 34 includes three flags, namely, a cache-owns flag 34a, a cache-does-not-own flag 34b and a cache-read-only flag 34c, which are also used in a conventional manner to control access to the associated data block.

When the processor 10 selects a cache storage location for a data block from the free list, the processor asserts the cache owns flag 34a in the associated tag. When that block is to be included in a disk write operation, the processor also asserts the cache read-only flag 34c and the tag write lock flag 32b, so that the block can be read during a read request but can not be overwritten during a write request. When the disk write operation is in progress, the processor asserts the write-in-progress flag 34a so that the data block cannot be overwritten or read.

After the write operation is completed, the processor resets the write-in-progress flag 32a and the tag write lock flag 32b in the semaphore field 32 and the cache-owns and cache-read-only flags 34a and c in the owner field 34. It also asserts the cache does-not-own flag 34b, to indicate that the cache location is now free. These flags, which are sometimes referred to as read and write monitors, prevent users from overwriting and/or reading data which is in the process of being transferred to disk. This is important in systems in which multiple users may be simultaneously working on portions of a data file.

Figure 3:
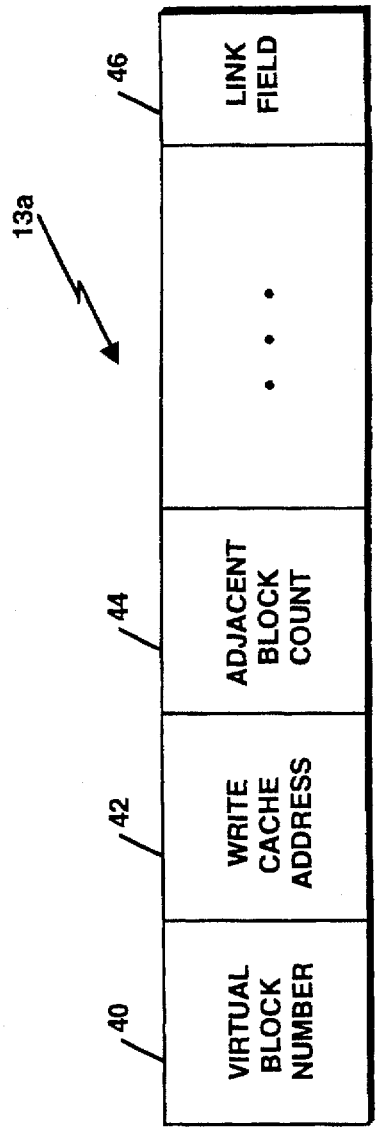
FIG. 3 depicts a block descriptor.
Figure 4A:
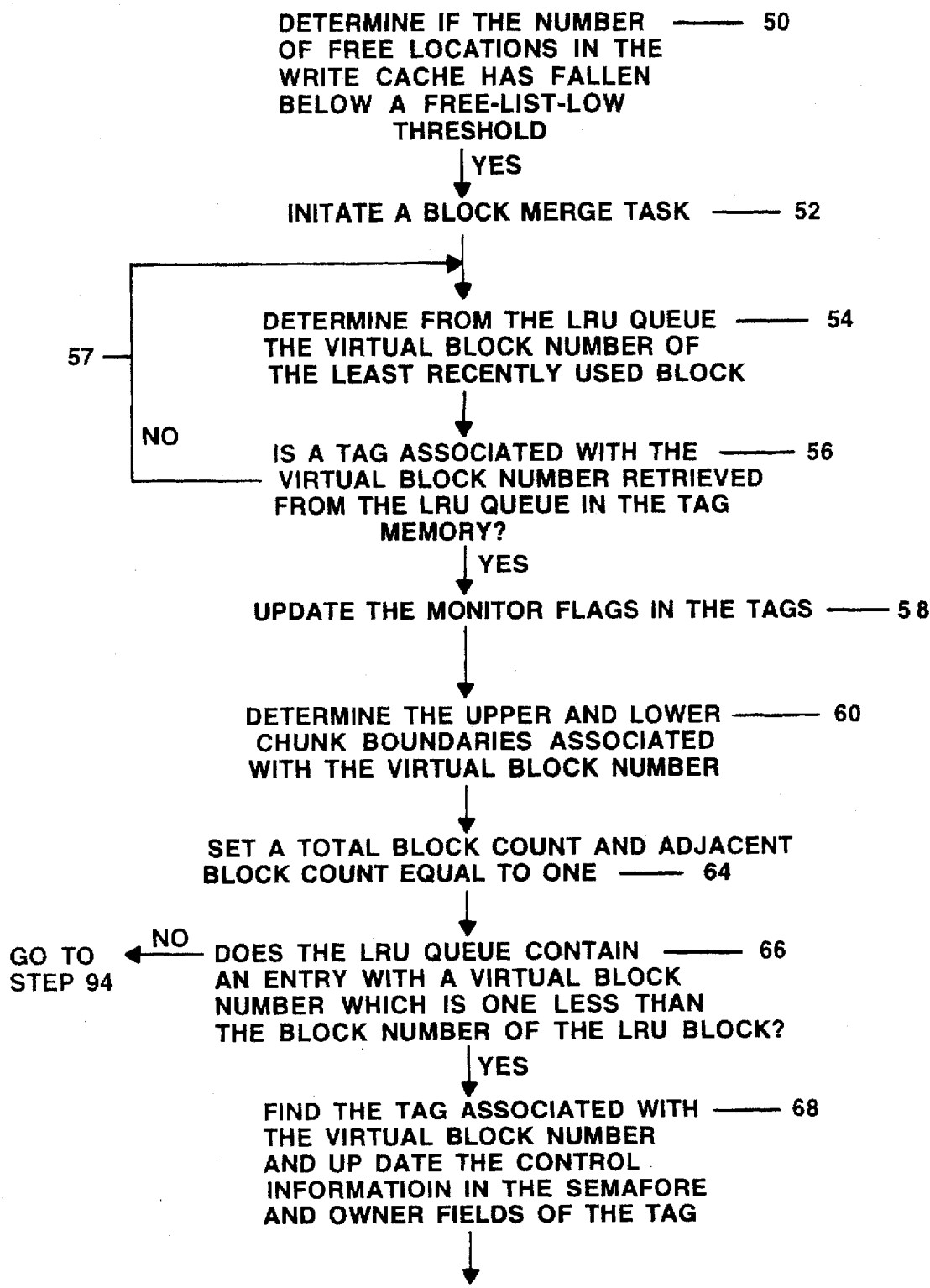
FIGS. 4A–4D is a flow chart of the operations of the processor in determining data blocks for inclusion in a disk write operation and communicating to a disk controller.
Figure 4B:
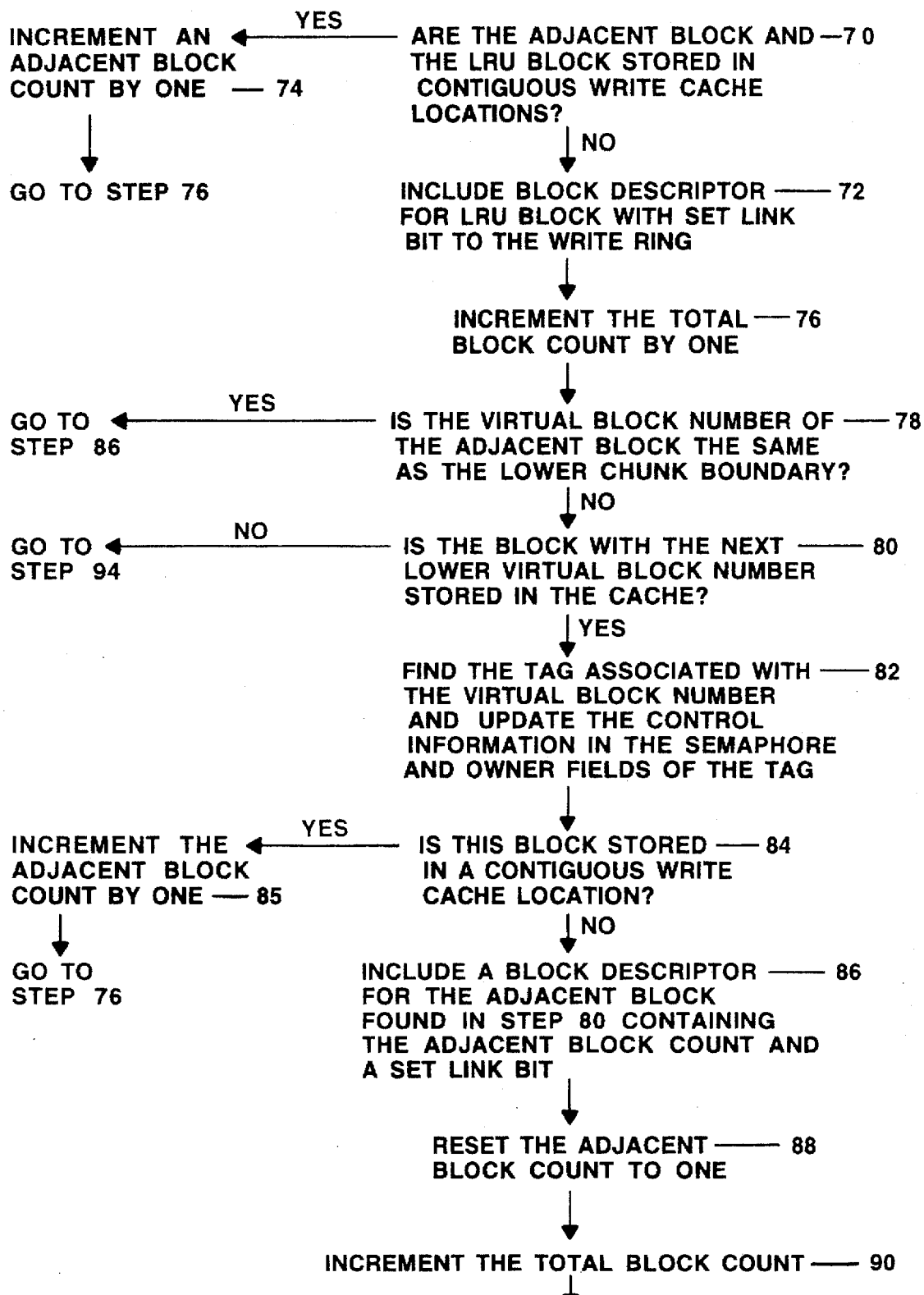
Figure 4C:
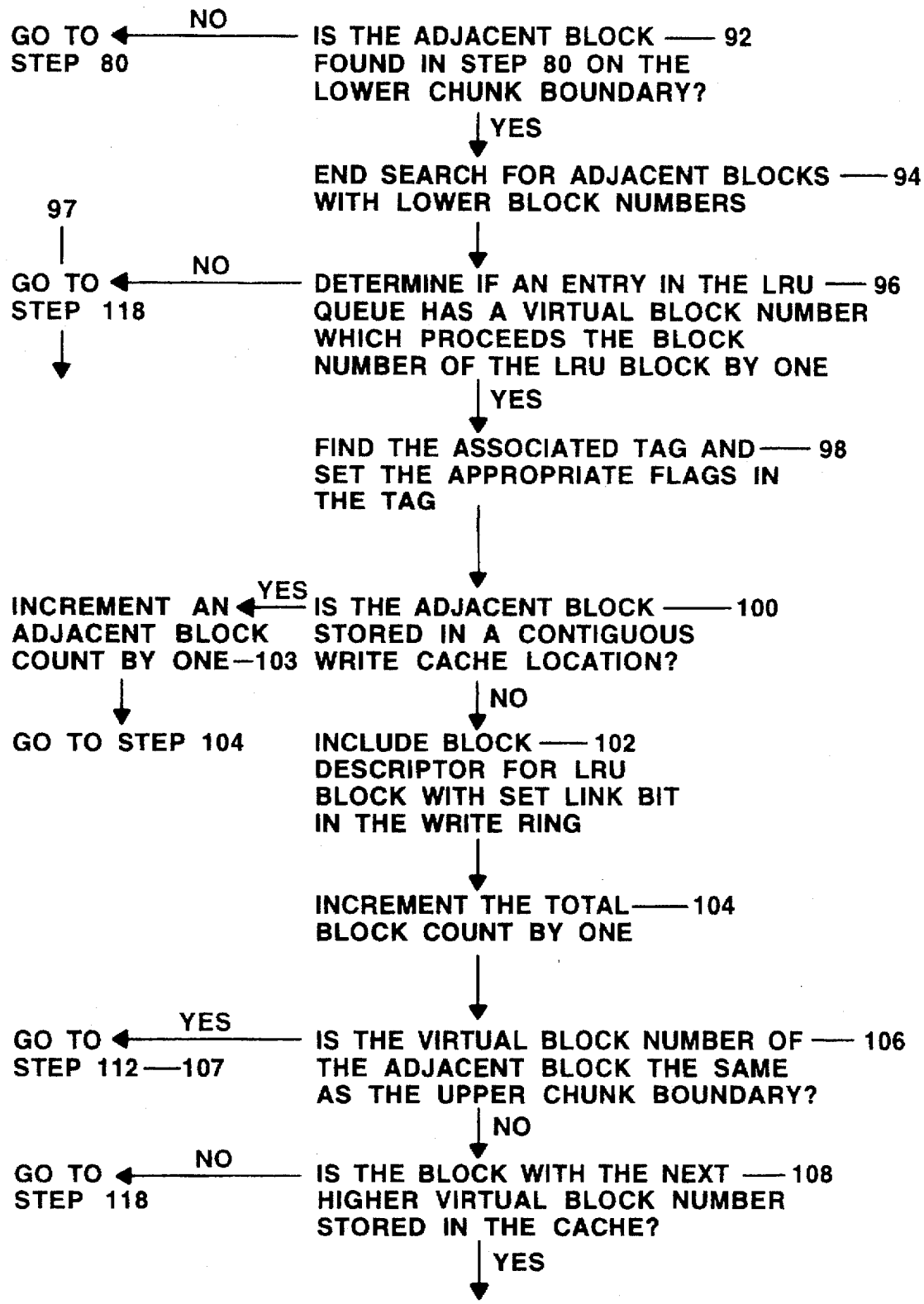
Figure 4D:
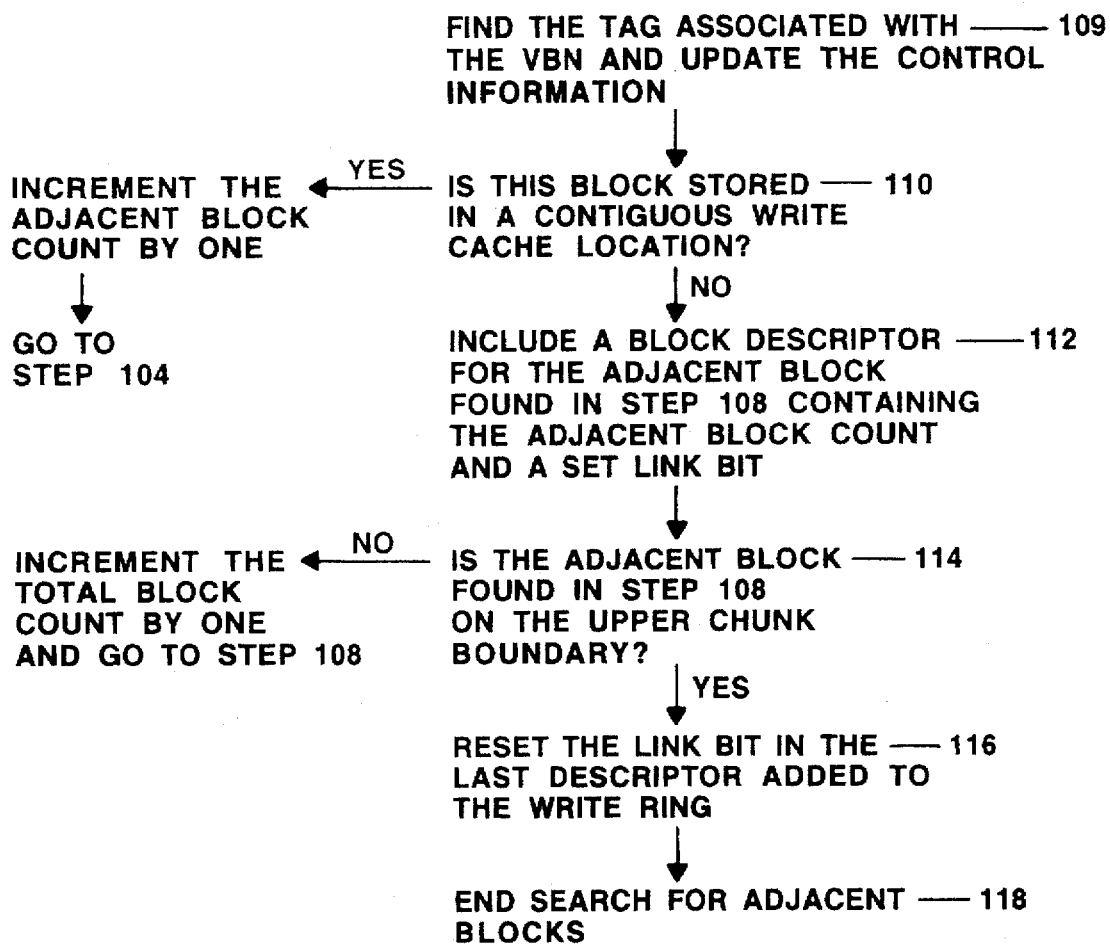

FIG. 3 depicts a block descriptor 13a. The block descriptor includes a virtual block number field 40, containing the virtual block number of an associated data block, a write cache address field 42, containing the address of the cache location that holds the associated data block with the lowest virtual block number, an adjacent block count field 44 containing a count of the number of blocks represented by the descriptor and a link field 46 containing a link bit that is set if the associated block is part of a write operation involving further data from non-contiguous cache locations and reset if the associated blocks are the last or only blocks in the write operation.

Referring now to FIGS. 1 and 4A–4D, the control processor 10 monitors the location-free table 14 to determine if the number of locations in the write cache 20 which are free has fallen below a free-list-low threshold (step 50). This free-list-low threshold relates to a condition in which a relatively high fraction of the total number of cache blocks contain data to be written to disk. When this threshold is reached, the processor initiates a block-merge task (step 52).

The control processor determines from the LRU queue 11 the virtual block number of the least recently used block, which is the block at the top of the LRU queue (step 54). The processor then uses the virtual block number retrieved from the LRU queue to enter the tag memory 12 and retrieve the associated tag 12a (step 56). If the block has already been written to the disk, the processor does not find a tag and again refers to the LRU for a next virtual block number (step 57). If the processor finds an appropriate tag the processor retains it (step 58), sets a block count equal to one, determines the associated chunk boundaries and searches through either the tag memory 12 or the LRU queue 11 to find an entry with a virtual block number which is one less than the virtual block number of this block (steps 60–66). If the controller finds such an entry, it finds the associated tag and updates the control information in the semaphore and owner fields of the tag, as discussed above (step 68).

The processor 10 determines if the adjacent block and the LRU block are stored in contiguous cache locations (step 70). If they are not, the processor adds to the write ring a block descriptor for the LRU block (step 72). The descriptor includes the virtual block number of the block, a block count of 1 and a set link bit. If blocks are stored in contiguous locations, the processor refrains from adding a descriptor to the write ring. Instead, it increments an adjacent block count by one (step 74).

The processor next increments the total block count by one, to indicate that an associated write operation now includes a total of two data blocks (step 76). Next, if the adjacent block is not at a chunk boundary, the processor continues searching for an adjacent block having the next lowest virtual block number (steps 78–80). If the virtual block number is found, the processor increments the total block count by one and sets the appropriate flags in the tag (step 82). The processor then determines if this adjacent block is stored in write cache location which is contiguous to the location containing the earlier found adjacent block (step 84). If it is, the processor updates the adjacent block count and continues its search for adjacent blocks (step 85). Otherwise, the processor adds to the write ring a descriptor which represents the first adjacent block (step 86). If this first adjacent block and the selected LRU block are stored in contiguous cache locations, the processor includes in the descriptor the virtual block number of the adjacent block, an adjacent block count of two and a set link bit. It then resets the adjacent block count to one (step 88). If this adjacent block and the selected block are not stored in contiguous cache locations, the processor includes in the descriptor a block count of one (step 90).

The processor continues looking for adjacent blocks with lower virtual block numbers until it cannot find an adjacent block in the write cache or it reaches the associated lower chunk boundary, or if applicable the lower stripe boundary (steps 80 and 92–94).

Once the processor has finished its search for adjacent blocks with lower block numbers, it begins a similar search for adjacent blocks with higher block numbers (step 96). If the processor finds the adjacent block is in the write cache, it increments the total block count by one and sets the appropriate flags in the corresponding tag (step 98). The processor then determines if this adjacent block is on the upper chunk boundary, if it is, the processor adds a block descriptor to the write ring containing a reset link bit (steps 100–107). Otherwise, the processor continues searching for adjacent blocks.

If the adjacent block is not on the upper boundary, the processor determines if this adjacent block is stored in a write cache location which is contiguous to the location in which the LRU block is stored. If it is, the processor updates the adjacent block count (steps 100–104) and continues its search for adjacent blocks with higher block numbers. Otherwise, the processor refrains from updating the adjacent block count before continuing its search.

If the processor finds a number of adjacent blocks in contiguous write cache locations, it refrains from including as associated block descriptor on the write ring until it finds either a chunk boundary or an adjacent block in a non-contiguous location. Once either condition is met, the processor formulates an associated descriptor containing the lowest virtual block number of the contiguously stored adjacent blocks, the adjacent block count and a set or a reset link bit, as appropriate steps 108–114.

The processor continues to look for adjacent blocks, increment the block count and, as necessary, add associated descriptors to the write ring until either it cannot find a next adjacent block or it reaches the upper chunk boundary or, if appropriate, the upper stripe boundary. (steps 106, 114). When the processor finds the last of the adjacent blocks, it includes the associated descriptor a reset link bit to signify that is no further blocks are included in the write operation (step 116).

At the end of the two searching operations, the processor has a count of the total number of blocks included in the write operation and a write ring with one or more block descriptors included therein. At the same time the processor 10 is performing the searches and updating the write ring, it is also handling data requests from the host, reading data from the disk to the read cache 24 and writing data to the write cache 20. It is also appropriately updating the LRU queue 11, the tag memory 12, and the location-free-list 14. After the processor completes the searches, it may begin a next block-merge task, starting with the next block on the LRU queue 11.

Figure 5A:
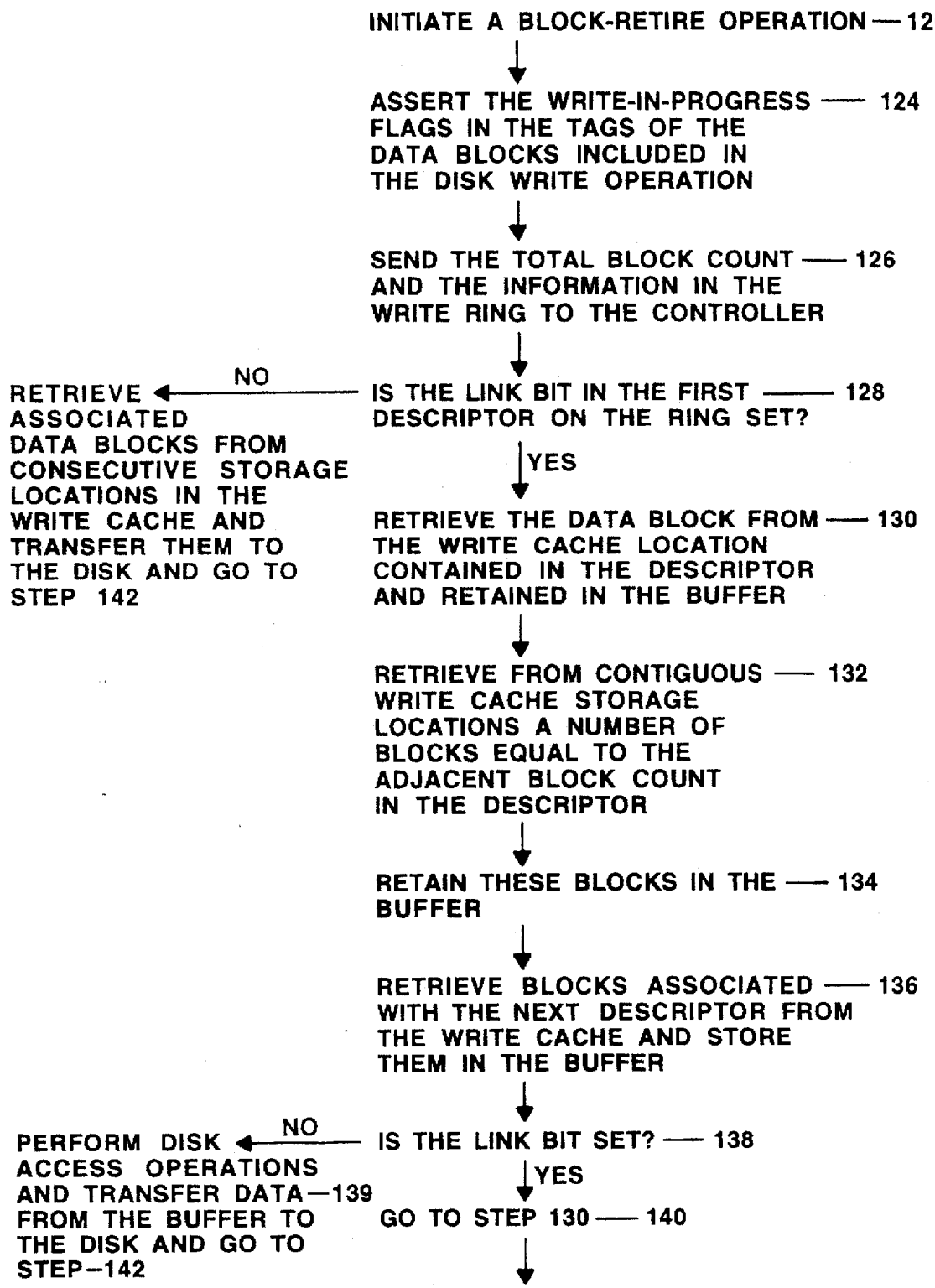
FIGS. 5A–5B is flow chart of the operations of the processor in performing a block-retire task.
Figure 5B:

Referring now to FIGS. 5A and 5B, once the processor 10 has found all the adjacent locations, the processor initiates a block-retire operation (steps 120). It then asserts the write-in-progress flags in the tags of the blocks associated with the descriptors in the write ring, i.e., with the write operation for which the block-merge task have been performed (step 124). Next, it sends to the disk controller 16 control information which includes the total number of blocks in the disk write operation and the contents of the write ring (step 126).

If the first descriptor on the write ring has a set link bit, the controller retrieves the associated data block or blocks based on the adjacent block count contained in the descriptor from contiguous locations in the write cache and retains them in consecutive storage locations in a buffer (step 128–134). The controller then retrieves from the write cache the data block or blocks associated with the next descriptor on the write ring and retains them in a next set of consecutive buffer locations and so forth, until it encounters a descriptor with a reset is link bit (steps 136–138). It then retrieves the data block or blocks associated with this descriptor from the write cache, adds them to the buffer and begins a disk access operation to transfer the data stored in consecutive locations in the buffer to the disk (steps 139).

If the first descriptor on the write ring has a reset link bit, the disk controller may perform a disk access operation and transfer the data blocks directly from contiguous cache locations if the controller has direct memory access capabilities. Otherwise, the controller includes these blocks, in the order they are retrieved from the cache, in the buffer and transfers them from the buffer to disk (step 129).

After the controller completes the transfer of data to the disk, the controller resets the appropriate read and write monitor flags and entries in the free location list to indicate that the associated write cache locations are free.

The system described above efficiently retires the least recently used blocks and all blocks held in the write cache which are to be stored in physically adjacent locations on the disk and, as appropriate, within the same chunk. The system includes in the control information sent to the disk controller information which "links" together data stored in non-contiguous write cache locations which is to be stored in contiguous storage locations on the disk. The controller then retrieves the data from these write cache locations and retains them, in order, in a buffer before performing a disk access operation to transfer the data to the disk. The system minimizes the amount of information required to indicate to the controller that data blocks are linked by including such information in a write ring in the form of a link bit, which is set to indicate that data blocks stored in non-contiguous write cache locations are included in the write operation and reset to indicate that data from contiguous write cache locations are involved in the write operation.

What is claimed is:

1. A system for managing a write cache to include in a write operation adjacent blocks in a chunk, the system including:
   A. a data storage device including a plurality of storage locations, each location holding a block of data;
   B. a controller for managing the write cache and the data storage device, the controller including
      i. a write ring for storing one or more block descriptors associated with blocks to be included in a write, operation,
      ii. a least recently used queue for listing block identifiers in order of use of the corresponding data blocks;
      iii. a storage-location-free list for storing information relating to free cache storage locations,
   the controller monitoring the storage location free list and when the list reaches a free-block-low threshold, (a) determining if adjacent blocks to a least recently used block are stored in contiguous write cache locations, (b) including the block descriptor of the least recently used block, where said block descriptor comprises a count of the number of adjacent blocks to the least recently used block, and including block descriptors of adjacent blocks not stored in contiguous write cache locations, in the write ring to indicate blocks to be included in a disk write operation and (c) when the list reaches a predetermined cache-almost-full threshold and all adjacent blocks have been determined, performing a storage device write operation to transfer the data blocks identified in the write ring to locations in the data storage device and removing the associated block descriptors from the write ring.

2. The system of claim 1, wherein
   the least recently used queue lists block identifiers that include a virtual block number which identifies a block and the data storage device location to which the block is directed;
   the controller further includes searching means for searching the least recently used queue to determine if blocks with virtual block numbers consecutive to the virtual block number of the least recently used block are held in the write cache;

the controller further includes means for determining if blocks with virtual block numbers adjacent to the virtual block number of the least recently used block are stored in contiguous cache locations;

the controller further includes means for adding a block descriptor for the least recently used block to the write ring;

the controller further includes means for adding a block descriptor to the write ring for a block which has a virtual block number adjacent to the least recently used block and is not stored in a contiguous cache location; and the controller further includes means for incrementing an adjacent block count and a total block count if a block with a virtual block number adjacent to the least recently used block is stored in a contiguous cache location.

3. The system of claim 2, wherein the search means includes means for determining chunk boundaries associated with the least recently used block;

means for determining if blocks with consecutive virtual block numbers lower than the virtual block number of the least recently used block and within the chunk boundaries are held in the write cache; and means for determining if blocks with consecutive virtual block numbers higher than the virtual block number of the least recently used block and within the chunk boundaries are held in the write cache.

4. The system of claim 2 wherein each block descriptor comprises:

a link bit which is cleared in the block descriptor associated with the last adjacent block to be included in said storage device write operation and which is set if the block has a virtual block number adjacent to the least recently used block and is not stored in a continuous cache location and is not the last adjacent block to be included in said storage device write operation;

an address field which comprises a cache address of a block having the lowest virtual block number of blocks to be included in said storage device write operation; and an adjacent block count field which comprises a count of the number of blocks represented by said block descriptor.

5. A method for merging blocks in a write cache for inclusion in a write operation, the method including the steps of:

A. maintaining a list of free write cache locations and a least recently used queue ordering block identifiers by time of use;

B. when the list reaches a free-block-low threshold, determining a least recently used data block in the write cache;

C. initializing a block count;

D. determining chunk boundaries associated with the least recently used data block;

E. initiating a search in a first direction for adjacent blocks with block numbers lower than the block number of the least recently used block, by determining if a block which is adjacent to the least recently used block and has a block identifier which is one less than the least recently used block is held in the write cache;

F. adding a block descriptor for the least recently used block to a write ring and incrementing an adjacent block count if the adjacent block and the least recently used block are stored in contiguous cache locations;

G. incrementing the block count;

H. determining if the adjacent block is on a chunk boundary, and if not, determining if a block adjacent to the adjacent block is held in the write cache;

I. if an adjacent block is found, repeating steps F–H;

J. if an adjacent block is not found determining if an adjacent block with an identifier which is one greater than the identifier of the least recently used block is held in the write cache;

K. initiating a search in a second direction for adjacent blocks with block numbers higher than the block number of the least recently used block, by adding a block descriptor for the least recently used block to a write ring and incrementing the adjacent block count if the adjacent block and the least recently used block are stored in contiguous cache locations;

L. incrementing the block count;

M. determining if the adjacent block with a higher identifier is on a chunk boundary;

N. if the block is not on a chunk boundary, determining if a block adjacent to the adjacent block with the higher block number is held in the write cache;

O. if so, repeating steps K–N until a chunk boundary is reached or an adjacent block is not found;

P. when said list reaches a cache-almost-full threshold, performing a storage device write operation to transfer the data blocks identified in the write ring to locations in a storage device.

6. The method of claim 5 wherein each block descriptor comprises:

a link bit which is cleared in the block descriptor associated with the last adjacent block to be included in said storage device write operation and which is set if the block has a virtual block number adjacent to the least recently used block and is not stored in a continuous cache location and is not the last adjacent block to be included in said storage device write operation;

an address field which comprises a cache address of a block having the lowest virtual block number of blocks to be included in said storage device write operation; and an adjacent block count field which comprises a count of the number of blocks represented by said block descriptor.

7. A system for managing a write cache to include in a write operation adjacent blocks that are held in the write cache, the system including:

A. multiple data storage devices, each storage device including a plurality of storage locations, each location holding a block of data;

B. a controller for managing the write cache and the data storage devices, the controller including
   i. a write ring for storing one or more block descriptors associated with blocks to be included in a write operation,
   ii. a least recently used queue for listing block identifiers in order of use of the corresponding blocks;
   iii. a list for storing information relating to free cache storage locations, the controller monitoring the list and when the list reaches a free-block-low threshold, (a) determining if adjacent blocks to a least recently used block are stored in contiguous write cache locations, (b) listing the block descriptor of the least recently used block, where said block descriptor comprises a count of the number of adjacent blocks to the least recently used block, and block descriptors of adjacent blocks not stored in contiguous write cache locations, in the write ring which indicates blocks to be included in a disk write operation and (c) when the list reaches a predetermined cache-almost-full threshold and all adjacent blocks have been determined, performing a write operation to transfer the blocks identified in the write ring to locations in the data storage devices and removing associated block descriptors from the write ring.

8. The system of claim 7, wherein the least recently used queue lists a data block by a virtual block number, which identifies the block and the data storage device location to which the block is directed, and a virtual device number, which identifies the data storage device to which the block is directed;

the controller further includes searching means for searching the least recently used queue to determine if blocks with virtual block numbers consecutive to the block number of the least recently used block are held in the write cache;

the controller further includes means for determining if blocks with virtual block numbers adjacent to the virtual block number of the least recently used block are stored in contiguous cache locations;

the controller further includes means for adding a block descriptor for the least recently used block, to the write ring; and the controller further includes means for adding a block descriptor to the write ring for a block having a virtual block number adjacent to the least recently used block and which is not stored in a contiguous cache location.

9. The system of claim 8, wherein the search means includes means for determining chunk boundaries associated with the least recently used block;

means for determining if blocks with consecutive virtual block numbers lower than the virtual block number of the least recently used block and within the chunk boundaries are held in the write cache; and means for determining if blocks with consecutive virtual block numbers higher than the virtual block number of the least recently used block and within the chunk boundaries are held in the write cache.

10. The system of claim 9, wherein said search means further include:
means for determining stripe boundaries; and
means for determining if adjacent blocks within the stripe boundaries are held within the write cache.

11. The system of claim 8 wherein each block descriptor comprises:

a link bit which is cleared in the block descriptor associated with the last adjacent block to be included in said storage device write operation and which is set if the block has a virtual block number adjacent to the least recently used block and is not stored in a contiguous cache location and is not the last adjacent block to be included in said storage device write operation;

an address field which comprises a cache address of a block having the lowest virtual block number of blocks to be included in said storage device write operation; and an adjacent block count field which comprises a count of the number of blocks represented by said block descriptor.

12. A method for identifying blocks held in a write cache for inclusion in a next storage device write operation to one or more storage devices in a multiple device storage system, the method including the steps of:

A. maintaining a list of free write cache locations and a least recently used queue which lists block identifiers by order of use of the corresponding data blocks, the block identifiers including a virtual block number and a virtual storage device number;

B. when the list reaches a free-block-low threshold, determining which of the blocks held in the write cache is a least recently used block;

C. initializing a block count;

D. determining the boundaries associated with the least recently used data block;

E. initiating a search in a first direction for adjacent blocks with block numbers lower than the block number of the least recently used block, by determining if an adjacent block, which has a block number which is one less than the least recently used block and the same virtual device number, is held in the write cache;

F. adding a block descriptor for the least recently used block to a write ring and incrementing an adjacent block count if the adjacent block and the least recently used block are stored in contiguous cache locations;

G. incrementing the block count;

H. determining if the adjacent block is on a boundary, and if not, determining if a block adjacent to the adjacent block is held in the write cache;

I. if an adjacent block is found, repeating steps F–H;

J. if an adjacent block is not found, initiating a search in a second direction for adjacent blocks with block numbers higher than the block number of the least recently used block, by determining if an adjacent block with a block number which is one greater than the block number of the least recently used block and having the same virtual device number, is held in the write cache;

K. adding a block descriptor for the least recently used block to a write ring and incrementing an adjacent block count if the adjacent block and the least recently used block are stored in contiguous cache locations;

L. incrementing the total block count;

M. determining if the adjacent block with a higher block number is on a boundary;

N. if the block is not on the boundary, determining if a block adjacent to the adjacent block with the higher block number is held in the write cache;

O. if so, repeating steps K–N until a boundary is reached or an adjacent block is not found;

P. when said list reaches a cache-almost-full threshold, performing a storage device write operation to transfer the data blocks identified in the write ring to locations in said multiple device storage system.

13. The method of claim 12 further including the step of determining if adjacent blocks within the same stripe are held in the write cache, if the storage devices have synchronous spindles.

14. The method of claim 12 wherein each block descriptor comprises:

a link bit which is cleared in the block descriptor associated with the last adjacent block to be included in said storage device write operation and which is set if the block has a virtual block number adjacent to the least recently used block and is not stored in a contiguous cache location and is not the last adjacent block to be included in said storage device write operation;

an address field which comprises a cache address of a block having the lowest virtual block number of blocks to be included in said storage device write operation; and an adjacent block count field which comprises a count of the number of blocks represented by said block descriptor.

15. The method of claim 14 wherein said boundary is a chunk boundary.

16. The method of claim 14 wherein said boundary is a stripe boundary.

17. A system for managing a write cache to include in a write operation adjacent blocks in a chunk, the system including:

A. a host for interconnecting one or more users to the system;

B. one or more data storage devices; and

C. a controller for simultaneously managing the write cache and data transfer requests from the host, the controller including i. a write ring for storing one or more block descriptors associated with blocks to be included in a write operation, ii. a least recently used queue for listing block identifiers in order of use of the corresponding data blocks;

iii. a storage-location-free list for storing information relating to free cache storage locations, the controller monitoring the storage-location-free list and when the list reaches a free-block-low threshold, (a) determining if adjacent blocks to a least recently used block are stored in contiguous write cache locations, (b) including the block descriptor of the least recently used block, where said block descriptor comprises a count of the number of adjacent blocks to the least recently used block, and including block descriptors of adjacent blocks not stored in contiguous write cache locations, in the write ring to indicate blocks to be included in a disk write operation and (c) when the list reaches a predetermined cache-almost-full threshold and all adjacent blocks have been determined, performing a storage device write operation to transfer the data blocks identified in the write ring to locations in the data storage device and removing the associated block descriptors from the write ring.

* * * * *